US008003942B2

(12) United States Patent
Garvey, III et al.

(10) Patent No.: US 8,003,942 B2
(45) Date of Patent: Aug. 23, 2011

(54) INFRARED IMAGING FOR MONITORING COMPONENT PERFORMANCE

(75) Inventors: Raymond Earl Garvey, III, Loudon, TN (US); Robert Darrell Skeirik, Knoxville, TN (US)

(73) Assignee: CSI Technology, Inc, Wilmington, DE (US)

( * ) Notice: Subject to any disclaimer, the term of this patent is extended or adjusted under 35 U.S.C. 154(b) by 0 days.

(21) Appl. No.: 13/017,573

(22) Filed: Jan. 31, 2011

(65) Prior Publication Data

US 2011/0125420 A1    May 26, 2011

Related U.S. Application Data

(63) Continuation of application No. 12/411,530, filed on Mar. 26, 2009, now Pat. No. 7,902,507, which is a continuation of application No. 11/424,361, filed on Oct. 3, 2006, now Pat. No. 7,528,372.

(60) Provisional application No. 60/728,064, filed on Oct. 19, 2005.

(51) Int. Cl.
*G02F 1/01* (2006.01)

(52) U.S. Cl. ........................................... 250/330

(58) Field of Classification Search .................. 250/330, 250/331–335, 336.1–336.2, 337, 338.1–338.5, 250/339.01–339.15, 340, 341.1–341.8
See application file for complete search history.

(56) References Cited

U.S. PATENT DOCUMENTS

| | | | |
|---|---|---|---|
| 3,868,508 A * | 2/1975 | Lloyd | 250/330 |
| 4,520,504 A | 5/1985 | Walker et al. | |
| 5,386,117 A | 1/1995 | Piety et al. | |
| 5,604,346 A | 2/1997 | Hamrelius et al. | |
| 6,849,849 B1 | 2/2005 | Warner et al. | |
| 7,071,462 B2 | 7/2006 | Young | |
| 2003/0083790 A1 | 5/2003 | Hattori et al. | |
| 2005/0111757 A1 | 5/2005 | Brackett et al. | |
| 2006/0043296 A1 | 3/2006 | Mian et al. | |

OTHER PUBLICATIONS

Madding et al., "Steam Leak Cost Estimation Using Thermographically Acquired Pipe Temperature Data," 1997, Proceedings of SPIE, vol. 3056, pp. 146-152.
Rozlosnik, "Infrared Thermography and Ultrasound Both Test Analyzing Valves," 1998, Proceedings of SPIE, vol. 3361, pp. 137-152.

(Continued)

*Primary Examiner* — David P Porta
*Assistant Examiner* — Kiho Kim
(74) *Attorney, Agent, or Firm* — Luedeka, Neely & Graham, P.C.

(57) ABSTRACT

A system and method for enhancing inspections using infrared cameras through in-field displays and operator-assisted performance calculations. A handheld infrared imaging system typically includes an infrared camera having a programmed computer and an interactive user interface suitable for displaying images and prompting response and accepting input from the infrared camera operator in the field during an inspection. An operator may designate at least one thing of interest on a displayed infrared image; and the programmed computer may uses a performance algorithm to estimate performance associated with the thing of interest. The programmed computer may extract information or parameters from previously measured data. The programmed computer may vary the way in which it displays new measurements based on the information extracted from the stored data. One or more of the parameters extracted from the IR image may be adapted to provide an automated alert to the user.

9 Claims, 7 Drawing Sheets

OTHER PUBLICATIONS

Adorama News Desk, A Hi-Res 1-Pixel Camera? They Do It With Mirrors, Oct. 3, 2006, http://www.adorama.com/catalog.tpl?op=NewsDesk_internal&article_num=100306-1 (1 page).
BBC News, Single-Pixel Camera Takes on Digital, Jan. 16, 2007, http://newsvote.bbc.co.uk/mpapps/pagetools/print/news.bbc.co.uk/2/hi/technology/6263551.stm (2 pages).
Cosmos Magazine, Single-Pixel Camera Creates H-Res Images, Oct. 9, 2006, http://www.cosmosmagazine.com/node/745 (2 pages).
Dvice, Researches Working on Single-Pixel Camera, Jan. 19, 2007, http://dvice.com/archives/2007/01/researchers_working_on_singlep.php (1 page).

* cited by examiner

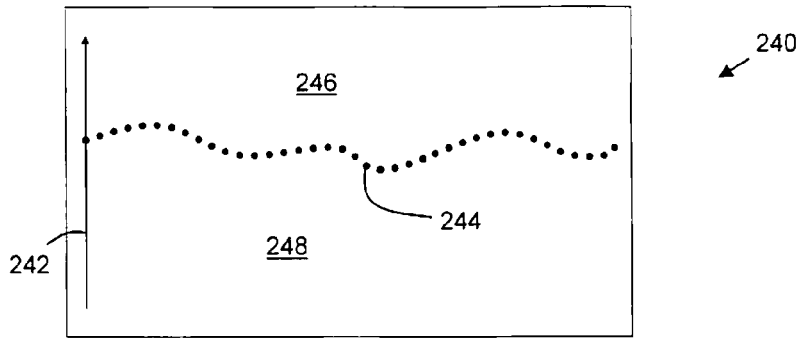
Figure 9
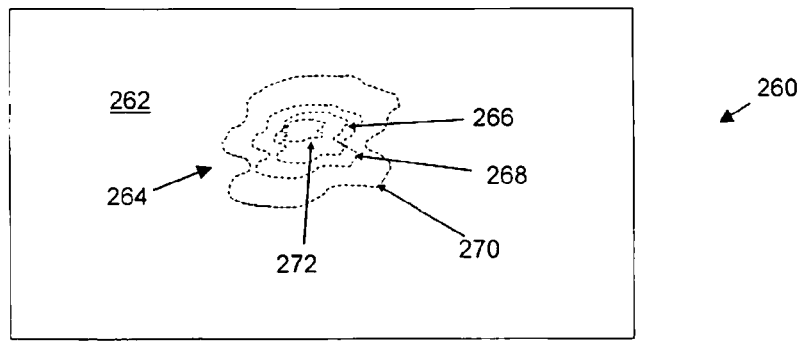
Figure 10
Steam Loss through failed trap  ← 280
| | | | |
|---|---|---|---|
| Orifice Size: | .218 | inches | Calculate |
| Pressure: | 5 | psig | Help |
Cost of Steam per 1000 lbs:  $ 7.5
(The Cost of Steam can be changed to fit your needs).
Hrs per day process operates:  12  hours
Days per yr process operates:  91  days
Approx Steam Loss:  24.1  lbs/hr
Approx Cost of Steam Loss/Yr  $ 197.38
Figure 11

INFRARED IMAGING FOR MONITORING COMPONENT PERFORMANCE

CROSS REFERENCES TO RELATED APPLICATIONS

This application is a Continuation of currently allowed U.S. patent application Ser. No. 12/411,530 filed Mar. 26, 2009, entitled "METHODS FOR INFRARED INSPECTION USING PROGRAMMED LOGIC." This Application and U.S. patent application Ser. No. 12/411,530 are Continuations of U.S. patent application Ser. No. 11/424,361 filed Oct. 3, 2006, entitled "APPARATUS AND METHOD FOR INFRARED IMAGING WITH PERFORMANCE ALGORITHM," granted as U.S. Pat. No. 7,528,372. This patent application claims priority from and is related to U.S. Provisional Patent Application Ser. No. 60/728,064 filed Oct. 19, 2005, entitled: "INFRARED IMAGING WITH PERFORMANCE ALGORITHM." This application claims a priority date of Oct. 19, 2005, which is the effective filing date of currently allowed U.S. patent application Ser. No. 12/411,530 filed Mar. 26, 2009, which claims priority from U.S. patent application Ser. No. 11/424,361 filed Oct. 3, 2006 and granted as U.S. Pat. No. 7,528,372, which claims priority from U.S. Provisional Patent Application Ser. No. 60/728,064 filed Oct. 19, 2005. U.S. patent application Ser. Nos. 12/411,530, 11/424,361, and U.S. Provisional Patent Application Ser. No. 60/728,064 and U.S. Pat. No. 7,528,372 are incorporated by reference in their entirety herein.

FIELD

This invention relates to the field of inspection with infrared cameras. More particularly, this invention relates to infrared cameras for assessing performance characteristics of equipment.

BACKGROUND

Infrared imaging systems capture two dimensional information regarding electromagnetic radiation that is emitted by objects in a designated region of the infrared spectrum over a field of view. Typically the two dimensional information is captured at a focal plane that is perpendicular to the optical axis of a focusing lens or mirror and passes through the focal point of the lens or mirror. Techniques have been developed to display the information at the focal plane in a visible spectrum in a manner that indicates comparative levels of infrared emission intensity across the focal plane. Because warmer objects radiate more infrared radiation and cooler objects radiate less infrared radiation, the displayed images provide an indication of the comparative temperature of objects in the field of view.

Infrared imaging technology has developed very rapidly, particularly since the widespread acceptance of uncooled focal plane array detectors. Imagers are now capable of detecting faulty steam traps, leaking hydrocarbon gases, water leaks in roofing, inadequate building insulation, effect of friction from various causes, electrical faults, heat exchanger faults, fluid levels, etc. Problems and other findings may be detected by a skilled in-field operator using a modern infrared camera appropriate to the task. Another important development has been the integration of computational systems, digital displays, and versatile user interaction devices into handheld or otherwise portable infrared imaging systems like those disclosed Piety in U.S. Pat. No. 5,386,117 (referred to hereinafter as '117), Warner in U.S. Pat. No. 6,849,849 (referred to hereinafter as '849), Hamrelius in U.S. Pat. No. 6,984,824 (referred to hereinafter as '824), and Garvey in US Patent Application Publication US 20060017821 (referred to hereinafter as 20060017821). However, there are problems with existing technology. These problems include:

- Detection and documentation of one or more of the cited problems result in an incomplete in-field solution.
- Set-up requirements to adequately interpret the signal are too complex or require a higher level of end user knowledge.
- Manually configured evaluation parameters cannot be readily adapted to changing conditions in the monitored asset.
- Inadequate methods to automatically compare current readings with previous measured or stored readings.
- Inability to monitor an asset and detect significant variations from previous measurements in an automated fashion.

What are needed are devices and methods for things like estimating the cost of not taking corrective action, defining aspects of the corrective action that are needed, and verifying that the corrective action was accomplished and desired performance improvement has been achieved.

SUMMARY

Various exemplary embodiments provide a portable apparatus for performing in-field analysis of an object performing its function. Typically the system includes a portable computerized camera system for producing analyzed infrared measured information corresponding at least in part to the object. The system also generally incorporates a user interface that is in communication with the computerized camera system for displaying an image, displaying at least one thing of interest on the image, and displaying a result, where the computerized camera system is programmed with additional information about the thing of interest and programmed with a performance algorithm that uses the analyzed infrared information and additional information about the thing of interest to calculate a result corresponding to a performance determination associated with the object.

Some embodiments provide portable apparatus for performing in-field analysis of an object performing a function. The system usually includes a computerized infrared camera system for producing an infrared image of the object, where the infrared image contains thermal information corresponding to the object, and where the computerized infrared camera system is programmed for analyzing the thermal information to produce a result. Generally the system provides a user interface in communication with the computerized system for displaying the infrared image, for receiving user input corresponding to the object in the thermal image and for displaying the result. The computerized system is further programmed with additional information corresponding to the intended function of the object and further programmed with a performance algorithm that uses the thermal information, the user input and the additional information to calculate the result corresponding to a level of performance of the object in performing its function.

Methods are provided for analyzing the performance of an object in an image produced by a portable infrared imaging apparatus. Typically a method includes a step of defining a thermal zone in the image, where the thermal zone has a boundary. A typical further step is to determine a first image expanse between a first point and a second point on the boundary of the thermal zone where the first point and the second point are spaced apart a known reference distance. Typically in an additional step, a second image expanse is determined between a third point and fourth point spaced apart a first unknown distance in the image. Then in a further step, a first estimated distance between the third point and the fourth point in the image is calculated using the known reference distance and a ratio between the first image expanse and the second image expanse.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 9 is an illustration of a flashover line representation as displayed on a portable infrared camera system.

FIG. 10 is a somewhat schematic illustration of a rollover indication as displayed on a portable infrared camera system.

FIG. 11 is a table representing estimates displayed on a portable infrared camera system for steam loss through a failed steam trap.

DETAILED DESCRIPTION

Figure 1:
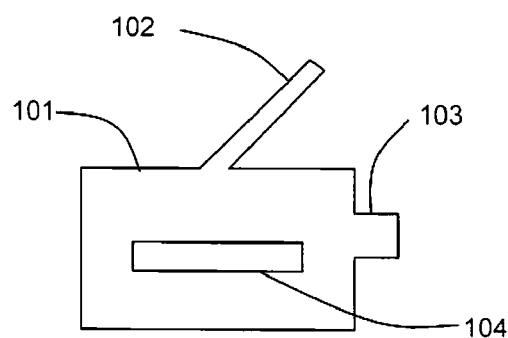
FIG. 1 is a block diagram of an infrared camera system.

Described herein are various embodiments of portable apparatuses for performing in-field analysis of an object performing its intended function. Also described are processes for analyzing the performance of an object in an image produced by a portable infrared imaging apparatus. Many of the embodiments described herein involve performing calculations in a transportable infrared imaging system to assist the operator with the in-field inspection or surveillance processes, including possibly short-term continuous monitoring with live update. These techniques apply to a range of inspection operations including the following examples: building insulation, furnace and boiler and refractory structures, firefighting, power transmission and distribution, hydrocarbon leaks, valve operation, effects of mechanical friction, and other thermally responsive applications.

One element that is applied in most embodiments is a performance algorithm. A performance algorithm uses analyzed infrared information and additional information about a thing of interest to calculate a result corresponding to a performance determination associated with the thing of interest. Performance algorithms are distinguished from other algorithms which simply analyze infrared information without evaluation any non-thermal aspect of the object or its function. Results produced by such other algorithms may be a graphical representation of infrared data, quantification of thermographic statistics, alarm conditions, or other conclusion based solely on temperature and emissitivity characteristics.

Examples of "analyzed infrared information" that may be used in a performance algorithm includes absolute, differential, and relative temperature measurements; temperature line-profiles and area-histograms and hot-spot and cold-spot over space; infrared emissivity selection; thermal contour mapping; and infrared imagery with graphical enhancement. The analyzed infrared information may also be a finding such as "steam trap failed" or "missing insulation". Examples of "additional information" that may be used in a performance algorithm include camera parameters such as effective lens focal length, focus distance, fields of view, and minimum detectible limits with respect to a sensed object. Additional information may also include data regarding normal and abnormal operating parameters (such as temperature, dimensions, insulating values, leak rates, thermal conductivity, energy consumption, and for equipment being inspected. Additional information may also include physical parameters such as physical property constants or variables. Additional information may also include typical or default or optional respective numerical values associated with algorithmic parameters.

The performance determination (i.e., the calculation result) produced by a performance algorithm includes an understood aspect of the object in its intended function. The "understood aspect" is typically an object of the infrared inspection. For example during a steam trap survey, understood aspects are those things observed and concluded by the operator using the infrared imager that reveal the operating condition of the trap: normal, failed open, failed closed, intermittent, or not operating. For another example, the understood aspect may be a physical law such as a mathematical relationship between changing temperature and changing electrical power or mechanical friction. For yet another example the understood aspect may be an experience based calculation or rule of thumb determination such as concluding or assuming the insulating R-value for a portion of a roof is diminished 70% because of evidently water-logged insulation. In other words, the performance determination is an assessment of performance of the object considering its intended function. Examples of performance determinations include, proportional dimensions, valve performance characteristics, gas emissions quantities, electrical fault characteristics, insulating functionalities, fire characteristics, effects of friction, cost estimations, rate of change and deviation from a baseline image.

Equipment and methods disclosed herein apply to widely varied applications. Here are some example applications.

Furnace and boiler and refractory structure inspection—Provide quantitative results regarding length, area, and associated thermal aspects collected during the inspection. Use this information in a performance calculation.

Valve operation—estimate the material or financial losses from failed steam trap or other valve operations, calculate the cycle time, characterize valve or trap as over-size or under-size or okay.

Hydrocarbon leaks—estimate the volume of gas cloud due to fugitive emissions, estimate the mass flow rate, estimate the cost of the leak, estimate dimensions subject to spark ignition possibilities.

Building inspection—Allow less sophisticated operators to perform more valuable inspections using the algorithms in the camera to estimate R-value, heat losses, and opportunities for cost savings.

Firefighting—provide quantitative calculations regarding thermal danger and safe zones, flame characteristics, and physical dimensions or proportions.

Power transmission and distribution—estimate remaining time to failure for an electrical connection based on temperature increase, estimate efficiency for convection radiators.

Machinery health—estimate aspect(s) of mechanical friction.

Equipment and methods disclosed herein generally advance the state of the art by providing in-camera firmware, which is imbedded software, with a performance algorithm calculation or specific display algorithms to assist the operator to perform his job more effectively and efficiently. It is in the field that the operator has the best opportunity to postulate, understand, and explain things calculated for analysis and reporting purposes. Various devices and methods disclosed herein help relieve the burden of reconstructing field observations in the field when later attempting to evaluate performance aspects of equipment observed in the field. Equipment and methods disclosed herein typically enable the practical common use of analyses that previously could only be done in a time-consuming manner for relatively rare circumstances which justify the use of in-office desk-top applications to perform such time consuming research and analysis. Exemplary embodiments also provide the ability for the end user to establish live infrared monitoring of an image with automated analysis or alarming based on deviations from a previously measured image or set of images. In summary, many of the devices and methods disclosed herein provide a system and method for enhancing inspections using infrared cameras through the use of in-field, operator-assisted performance calculations and display techniques.

Some exemplary embodiments incorporate a handheld infrared imaging system which includes an infrared camera, a programmed computer, an interactive user interface suitable for displaying images and prompting response and accepting input from the infrared camera operator in the field during an inspection, wherein the user interface enables an operator to designate at least one thing of interest on a displayed infrared image; and the programmed computer uses a performance algorithm to estimate performance associated with the thing of interest such as one of the following: a dimensioned-measurement value or a thermal-property characteristic or an electrical-property characteristic or a cash value or a rate-of-change characteristic or an assessment of risk or danger.

Certain embodiments employ a method for assisting the operator of a handheld infrared camera to accomplish a performance calculation supporting in-field analysis of an item of interest. For example, the operator carries a programmed infrared camera into the field to perform an inspection using infrared imaging. During the inspection the operator identifies a thing of interest. The operator actuates a user interface to select the thing of interest on the infrared image. The programmed infrared camera then uses a programmed performance algorithm to estimate performance associated with either the thing of interest or with other objects contained in the image.

Many embodiments use a modern infrared camera system capable of detecting and reporting problems of interest such as faulty steam traps, leaking hydrocarbon gases, water leaks in roofing, inadequate building insulation, effect of friction from various causes, electrical faults, heat exchanger faults, fluid levels. Infrared imaging systems disclosed by Piety in U.S. Pat. No. 5,386,117, Warner in '849, Hamrelius in '824, and Garvey in US 20060017821, represent the diversity of handheld and other portable infrared imaging systems having four elements schematically represented by FIG. 1, a typical infrared camera system (101) which includes internal computer having firmware and memory, user interface (102), infrared imaging lens (103), and mechanism for easily transporting the imager (104). The user interface (102) always includes at least a visual display to prompt the user and report calculated performance results. A system similar to that described by Warner relies entirely on interacting with the user through the display so its operations must be preconfigured with little or no user input. More sophisticated user interfaces like those described by Piety '117, Harmelius '849, and Garvey US 20060017821, enable the user to interact, providing inputs and responding to prompts using a display, a cursor, a mouse or joystick, a touch screen, push buttons, a full keypad, a microphone, and equivalent things, any of which are built into a camera body, preferably, but which alternatively could be external. By reviewing these four invention disclosures, one may understand the diverse user interface options that are available for establishing communications between a user in the field and the operating system of a computerized infrared camera system.

Exemplary embodiments use one or more firmware performance algorithms to estimate a performance parameter derived at least in part using information derived from an infrared image. Typically this involves either the use of firmware to provide calculations in the field which are used to by the operator to perform analysis or to create at least a portion of the reporting process while in the field and/or the use of previous measurements to optimize the display of a newly captured or live image for identification of changes or fault conditions. Here are some of many different ways that this may be implemented by ones skilled in relevant technical disciplines.

For example, one may calculate steam losses from a seam trap or other valve application. An infrared imager is particularly good at non-intrusively revealing information about steam trap operation. In some instances a particular design trap is intended to be normally open. If this type trap fails in the closed position, the failure may be detected using an infrared imaging camera and an appropriate calculation may be made using best information available such as system pressure and pipe diameter. This calculation may be improved using measured temperatures, pressure, sonic decibel or ultrasonic decibel values, cycle-time, or other related measurements or observations.

As another example, one may calculate gas losses from leaking hydrocarbon gases. Certain infrared imagers are capable of imaging the presence of leaking hydrocarbons such as methane, ethane, butane, etc. In this case the infrared imager appears to be detecting the absence of infrared radiation which has been absorbed by the gas after it was emitted from a surface behind the gas. The imager is able to see the presence and relative size of the plume emanating from a leak source. A performance algorithm may be employed to calculate the volume of gases by one of several means. One way is to first determine the detectable hydrocarbon concentration. Then by scribing a contour line around the detected gases originating from the leak, it is reasonable to assume a gas concentration at that contour. Furthermore, it is conceivable that the diminishing radiation from behind the gas could also be used to calculate the relative increase in gas concentration close to the leak. Additional ultrasonic monitoring may be used to enhance or validate a leakage calculation algorithm. There are also safety considerations and calculations that may be employed considering the fuel to oxygen ratio. It is conceivable that one may estimate the damage that may be done if a spark were to ignite in a vicinity of the hydrocarbon leak and display this risk or danger to the operator through the infrared camera system.

As another example one may calculate things about electrical applications. Infrared measurements and imaging may be used to detect the presence of faults in electrical power, transmission, and distribution systems. These faults tend to be progressive. By knowing the temperatures and rate of change in temperature, one may estimate severity, power loss, time-to-failure, etc. Exemplary embodiments translate delta-temperature measurements made using an infrared camera into corresponding changes in electrical properties such as resistance or other impedance that produces heat. There are safety considerations here as well. Delta-temperature in these applications is often compared to ambient and compared between similar components operating under similar conditions.

For another example one may approximate energy loss, as well as repair or upgrade or replacement costs using a combination of assumed, known, and measured information. Infrared imaging is used in building inspection for roofing, walls, windows, flooring, etc. These imagers are highly sensitive picking up very small changes in temperature or emissivity due to moisture or various properties of insulation. These devices reveal possible problems. Such embodiments add value by quantifying the impacts of these observations and displaying that information to the inspector while in the field.

For another example one may calculate certain smoke or flame performance parameters using infrared imaging. Certain infrared imagers are able to view objects through otherwise obscuring flame or smoke. One type image is capable of inspecting the solid surfaces inside a boiler furnace while looking through flames exceeding 1000 degrees F. These imagers may detect clinkers, fouling, buildup, coking, refractory damage, and many other problems. One may use the information from the image to estimate the length, area, size, and volume of the furnace affected by the damage. That information may in turn be used in further calculations. Some imagers are able to report pertinent temperature information regarding the surfaces. If this information is produced, then thermal models may be verified using algorithmic calculations in the imager. A different kind of imager altogether is commonly used by firefighters to see through smoke, to identify people and objects, and to see the source and temperature of flames. It is logical that these imagers will be greatly improved by performance algorithm calculations to assist the firefighter in performing his or her diverse job functions. The imager may be used to assist the firefighters in assessing risk and alerting of dangerous conditions.

As another example one may calculate energy caused by mechanical friction. Mechanical energy losses due to friction translate into heat, noise, damage, and power transfer. By measuring the increased temperature due to friction, and assuming or measuring several other things about the component geometry and materials, one may estimate the friction energy, friction forces, friction coefficient. In this application, one normally compares temperatures to ambient and between similar components operating under similar conditions.

These examples (steam traps and other valves, leaking hydrocarbon gases, electrical applications, building inspections, smoke and flame applications, mechanical friction, etc.) illustrate just some of the ways in which in-the-field performance algorithms may assist the infrared inspector.

Infrared inspection using an on-board performance algorithm calculation may be done one-time or many times. Sometimes it is particularly valuable to continue to perform inspections during the process of making changes or adjustments intended to improve performance. Furthermore it may be useful to verify the effectiveness of performance changes after repairs or corrective actions are accomplished.

In some embodiments employing performance algorithms, personnel reviewing an image on the inspection camera may use software in the inspection camera to read, write, or respond to a note related to a measurement location. Such note may include one or more of the following:

- a safety instruction (e.g. "use protective gear", "stand minimum 3 ft. away from panel")
- a general procedural note (e.g. "use wide angle lens")
- a specific request for additional measurement type (e.g. "collect image from side of box", "zoom in on left breaker")
- a mandatory requirement for confirmation of an action taken by the end user in the field, such as by choosing from a set of predefined responses.

In such embodiments the note may include any combination of the following media:

text
graphic
voice
video
URL or hypertext ink

Application of the note may be specified as:

a forced display (i.e. pop-up) on next measurement survey
a forced display (i.e. pop-up) on every survey
an optional display (i.e. user initiated) on next measurement survey
an optional display (i.e. user initiated) on every survey When in the field, the user may have further ability to interact with the messaging system. For example, when a forced "pop-up" message is configured for a mandatory confirmation, the end user would typically be required to select from the predefined responses (e.g., "proper safety precautions implemented", or "special instructions read and understood"). The user may have the option to acknowledge a forced "pop-up" message that is assigned to the next measurement survey so that the message does not appear on the next measurement survey. Variations of this technique include, acknowledging a forced "pop-up" message assigned to the next measurement survey so that it is retained and will appear on the following survey as well, acknowledging a forced "pop-up" message assigned to the next measurement survey so that it will be displayed again in preset number of minutes, accessing an optional message on the next survey so that if no further action is taken the message expires and will not be displayed again, and accessing an optional message on the next survey and acknowledging it so that it will be retained as an optional message for the following survey.

In some embodiments, two-way communication may be established between a host computer, perhaps in the office, and the inspection camera in the field. In such embodiments the actions undertaken by the user in the field to interact with the messaging system are typically recorded and transferred to the host computer so that a user in the office is informed of the actions taken in the field. As a further enhancement in some embodiments, the end user in the field also has the ability to define additional notes which may take any of the forms described herein.

A live two-way communication link between a host computer and an inspection camera in the field may used for other purposes as well. For example, threshold values used to determine which pixels on a new (live) image are displayed in a distinguishable manner such as a differentiated color scheme may be downloaded to the inspection camera in the field. Other features of the image displayed on the inspection camera as well as elements of the performance algorithms used by the inspection camera in the field may also be controlled by the host computer using the two-way communication link The process of using a portable imaging apparatus having a field of view to analyze the performance of an object generally involves a number of steps. The analysis may include, or may entirely consist of, the use of a performance algorithm to calculate a dimensional performance characteristic of an object. In such a performance algorithm, one step typically involves determining a dimension of a first thermal zone in an image produced by the portable imaging apparatus. A thermal zone is an area of an image that has a common thermal property, and is bordered at least in part by an area of the image that has a different thermal property. For example, a thermal zone may be a first area of an image that represents temperatures ranging between 100° C. and 120° C., and at least a part of that thermal zone is bordered by a second area of the image that represents temperature less than 100° C. or greater than 120° C. Note that a thermal zone may or may not represent the shape of an object in an image. Often an infrared image of an object does not correlate geometrically very well with an image of the same object captured in the visible light spectrum.

Often a process involving proportional dimensions (also further described later herein) is then used in the performance algorithm to calculate a second dimension in the image. The process of using proportional dimensions often involves determining a first image expanse between a first point and a second point on the boundary of a thermal zone, where the first point and the second point are spaced apart a known reference distance. The term "image expanse" refers to a physical feature of the image, such as a pixel count, a subtended arc, or similar dimension. The process also generally involves determining a second image expanse between a third point and fourth point spaced apart a first unknown distance in the image. The second image expanse may be between two points on the same thermal zone, or two points on a different thermal zone. The process then typically proceeds with calculating an estimated distance between the third point and the fourth point in the image using the known reference distance and a ratio between the first image expanse and the second image expanse. In some embodiments dimensional adjustments for visual perspective may be used to enhance the accuracy of the calculation of the second dimension. The estimated distance may be a dimensional performance characteristic that by itself is an important performance characteristic of an object. For example, the length of a fire plume in a natural gas flame may be a performance characteristic of interest to an equipment operator.

In some embodiments a dimensional performance algorithm may include the use of multiple dimensions to calculate an area on the image.

In many embodiments, another step in the process of using a portable imaging apparatus to analyze the performance of an object involves using a thermal performance algorithm to calculate a thermal performance characteristic, such as calculating an average temperature, calculating a temperature difference, calculating a thermal gradient, defining an isotherm, or deriving some other temperature-related parameter associated with an object in the image. In some embodiments the thermal performance algorithm involves calculation of a trend over time as a thermal performance characteristic.

In exemplary embodiments, the result of the thermal analysis may be used at least in part to calculate further performance characteristics of an object in the image. Sometimes this calculation combines dimensional (length or area or volume or circumference) information from the image with thermal information from the image. Sometimes the calculation of such a performance characteristic utilizes additional information, that is, information beyond information that may be discernable from the image. Such additional information may include mechanical, electrical, or fluid characteristics of an object in the image. For example, if the object in the image is an electrical component, the additional information may be the current flowing through the electrical component, and the performance characteristic that is calculated may be the resistance of the electrical component. If the object in the image is a mechanical component, the additional information may be force and velocity vectors, and the performance characteristic that is calculated may be the mechanical friction of the object.

In some embodiments using a portable imaging apparatus to analyze the performance of an object, a calculated performance characteristic is compared against an alarm level to potentially generate an automated alert. The alarm level may be defined in the host computer and downloaded into the portable imaging apparatus.

Some embodiments described herein employ performance algorithms having many known and unknown variables. Typically, values for only some of these variables are perceived or measured in the field by the operator using the infrared camera. In the foregoing and following examples, some of the physical property values and constants or variables must be assumed or looked up from a table or other reference source. In some cases the firmware is programmed to insert default values for these. In other cases, the user is prompted to insert a value or select from a list of various values or make some other selection that logically determines the missing values. Many times the selection of the unknown variables and other material properties is a best guess or compromise often decided by the engineers who designed the firmware logic. Here are some examples of particularly useful performance algorithms.

Example 1

Proportional Dimensions

One purpose of a proportional dimension performance algorithm may be to estimate length in either relative or absolute units to measure things distinguished on a displayed visible or infrared image. Absolute units may be derived using focal distance or proportioned from a distinctive item of known dimension which is either already in the image or is placed there for this purpose.

Figure 2:
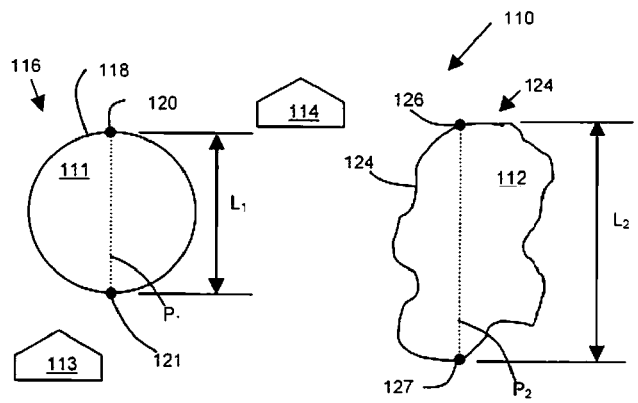
FIG. 2 is a schematic diagram of a display on a portable infrared camera system with items for dimensioning.

For example in FIG. 2, illustrating an image 110 displayed in a portable infrared camera system, if there is a first object 111 in the field of view. First object 111 is defined by a first thermal zone 116 having a boundary 118 with at least one known dimension, $L_1$, between a first point 120 and a second point 121 on the boundary 118. The portion of the image between the first point 120 and the second point 121 covers a pixel count $P_1$. There is also a second object 112 in the same or a similar field of view. The second object 112 is defined by a second thermal zone 122 having a boundary 124. Second object 112 has an unknown length $L_2$ that spans a distance between third point 126 and fourth point 128 on boundary 124. The portion of the image between the third point 126 and the fourth point 127 covers a pixel count $P_2$. Pixel counts $P_1$ and $P_2$ are examples of "image expanses." An image expanse is a feature inherent in an image that defines spatial relationships in the image. A performance algorithm may be used to calculate the dimension $L_2$, using the following equation: $L_2 = L_1 \times (P_2/P_1)$. Note that the first and second objects 111 and 112 do not have to be in the same field of view at the same time, but they need to be at roughly the same distance from the imager and at similar zoom settings for the calculation to be accurate. Note also that a reference thermal object of known dimensions may be specifically placed into the field of view by the operator in order to assist with calculation. Objects 111 and 112 may be distinguished using the infrared imager, or objects 111 and 112 may be distinguished using a visible imager that is combined with the infrared imager in a portable infrared camera system, or objects 111 and 112 may be distinguished by both the infrared imager and the visible imager. If object 111 has been specifically placed in the field of view by the user to assist in dimensional calculations, then object 111 may include identifying or orienting features such as notches or holes or tabs or pointers to assist the user with identification, location, orientation, and measurement.

Furthermore, if two objects such as 113 and 114, are placed in or found in the image and are recognizable in the image, then the spatial relationship between these two objects may be used to compute dimension and coordinates for other things, particularly in that focal plane. In addition, a characteristic shape of and size, or temperature, or surface emissivity may be used in the following ways.

Know values for characteristic shape and size of an object in the image, such as that represented by either of the pentagonal configuration displayed for 113 and 114 in FIG. 2, may be used to establish the orientation and dimension for at least that portion of the image. Characteristic temperature may be used to distinguish objects 113 and 114 from other things in the image. The operator who places these objects into the field of view may initiate warming or cooling them for this purpose. Characteristic emissivity which is substantially different from its background may be used to differentiate objects that are all at the same temperature, when viewed through an infrared imager. However, the operator should be particularly careful with very low emissivity materials like polished metal because these surfaces often reflect infrared energy quite well, and this should be considered when distinguishing the objects 113 or 114.

For another example, if one may establish the field-of-view-angle represented by one pixel or group of pixels, and if one may estimate the range to the object of interest, then the proportional length, $L_2$, of an object may be estimated from this equation: $L_2 = \text{Cosine (angle)} \times \text{range}$. The range may be visually estimated by the operator, it may be measured, it may be approximated using the focus setting, or it may be derived by another means. Often times, the lower edge of the image is closer to the imager than the upper edge. In this case it is appropriate to take the parallax view into consideration, recognizing the trapezoidal area represented by an image.

Example 2

Areas and Volumes

Figure 3:
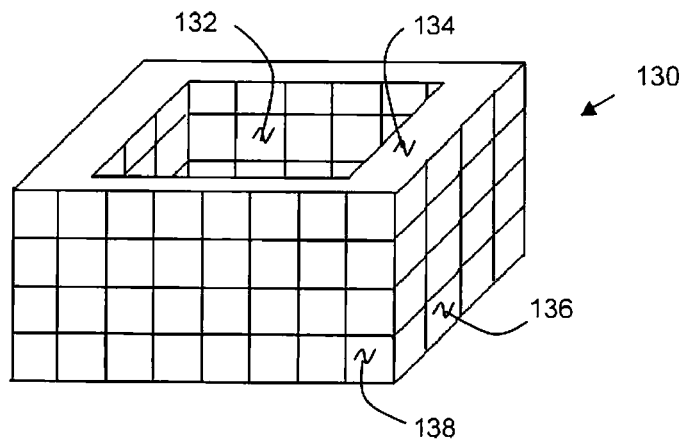
FIG. 3 is a depiction of a 3-dimensional reference thermal object that may be placed in the infrared image to provide both dimension and perspective.

Another purpose of a proportional dimension performance algorithm may be to use length information to estimate area, perimeter, or volume associated with an observed phenomenon relevant to performance of object being inspected. In one embodiment, a known (reference) object is selected to be three dimensional in nature, so as to already indicate the viewing angle. The known object may be composed of materials with various infrared properties to provide perspective to the image to improve the estimation of lengths, areas, and other physical characteristics. For example, FIG. 3 illustrates a reference thermal object 130 that has four surfaces 132, 134, 136, and 138 that may be distinguished from background when using an infrared imager. This distinction from background may be made using temperature differences, emissitivity differences, or a combination.

Object 130 in FIG. 3 is somewhat like objects 113 and 114 in FIG. 2 because it has characteristic shape and size to provide orientation and dimension reference for things in the image. Moreover, object 130 has three-dimensional aspects which give depth orientation to things in the image. If control markings like those shown in horizontal and vertical directions on various sides, inside and outside, of object 130, may be distinguished, then all things in the vicinity of object 130 may be interpreted in respective proportions and orientation. If the detail markings cannot be distinguished, then at least the three-dimensional outline of object 130 may be distinguished and interpreted either automatically by the programmed imager or manually by the in-field operator. Furthermore to the extent that the temperature of either object 130 in FIG. 3 or of objects 113 and 114 in FIG. 2 are at equilibrium with the surroundings; then by knowing the actual emissivity of a surface on one or more of those objects, one may interpret the relative emissivity of other surfaces at the same temperature in the field of view.

Figure 4:
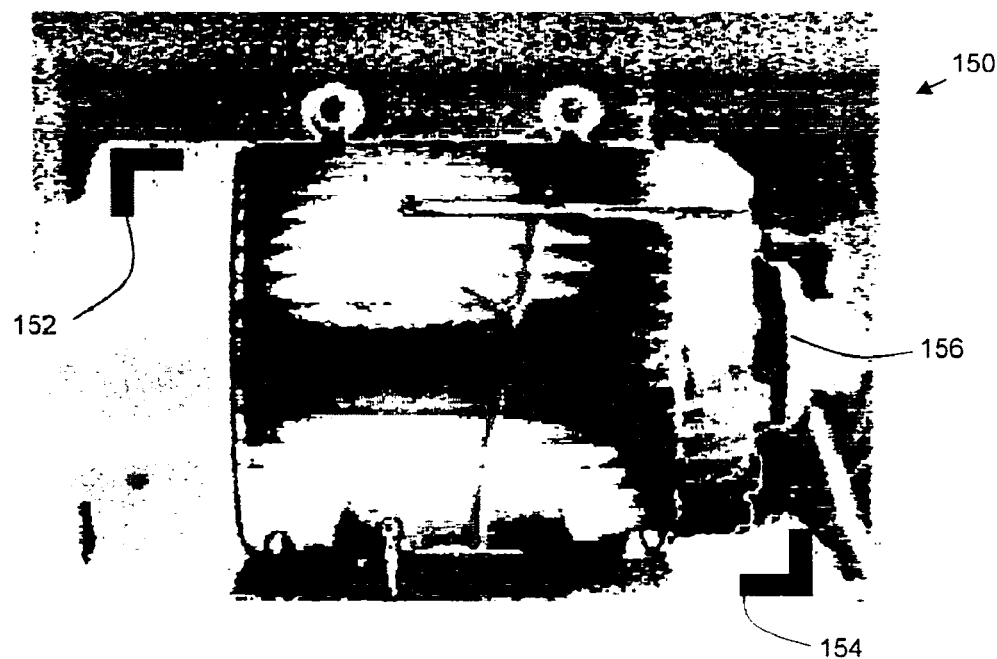
FIG. 4 is a depiction of an image in a portable infrared camera showing two reference thermal objects.

FIG. 4 depicts a simplified image 150 from a thermal imager. Image 150 has been converted from a color thermal image to a traditional black/white patent line drawing for purposes of illustration here. Analysis of image 150 by a performance algorithm is enhanced by the inclusion of two reference thermal objects 152 and 154. Reference thermal objects 152 and 154 each have known dimensions that facilitate calculations of features related to a motor 156 that is portrayed in image 150.

In short, the thermal and profile aspects of a known object may be used to characterize the thermal and spatial aspects of other things in a field of view.

For certain performance algorithm calculations it is helpful for the user to enable the imager to outline the vicinity of an area. This outline is created to designate an area associated with a particular characteristic which is distinguished from the adjacent area(s).

Thermographic isotherm lines may be used to create an outline of the vicinity of an area on an infrared image. In some cases imagers automatically create isotherm or similar color contour lines based on preset limits. In other cases, the operator selectively controls the creation of isotherm line or similar color contour mapping with the intent of marking off a desirable vicinity of an area as distinguishable from another.

Visible images may sometimes be superimposed on or mapped in correlation with or correspondence to associated infrared images. Such mapping is an example of "coordinating" two images. In some cases, the operator may select an optically distinguishable characteristic to indicate the vicinity of an area for consideration. For example a window may be discernable from the wall in which the window is located. Firmware in the imager is sometimes used to assist the operator with creating an outline around an object like a window or a living thing or a colored-differentiated thing or anything distinguishable from adjacent or background items. In this way, either the visible image, or infrared image, or both could be used to create an outline which is then available for use as it is and for further processing.

Example 3

Detection of Anomalies Using Calculations within an Area

For areas defined as above, it may be of interest to determine the maximum, minimum, simple or weighted average of a parameter contained within a defined area. This could be used in reference to the temperature profile of an object or to create an average of some derived parameter over the area. The values created by the applied averaging technique could then be appropriately labeled, stored, and displayed as a trend over time. Using this approach, it would be possible for the user to conduct regular scans of an object of interest, use this invention to establish dimensions and areas, derive averaged parameters within the area, and trend these parameters against some threshold value. As long as the derived parameters do not exceed the predetermined threshold, then the user does not need to analyze the image. If a threshold is exceeded, then the camera or associated software may generate a user alert indicating that the relevant image of the object of interest should be examined by the end user.

Example 4

Insulating value

Figure 5:
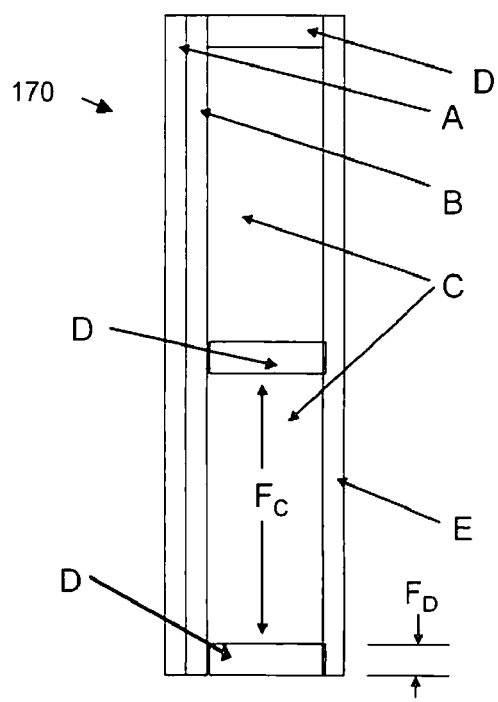
FIG. 5 is a schematic top view of the cross section from a wall showing components affecting heat loss calculations.

Another purpose of a proportional dimension performance algorithm may be to estimate the effective insulating R-value, or the change in effective insulating R-value for at least a portion of a wall using information obtained from an image such as gaps in insulation, wet insulation, incomplete coverage, etc. FIG. 5 presents a schematic top view of a section of a wall 170. Wall 170 includes studs D that have a spacing $F_C$ and a thickness $F_D$. A first front wall covering A, a second front wall covering B, and a back wall covering E are provided. Insulation C fills the space between the studs D and the second front wall covering /B and the back wall covering E. The studs D, the first front wall covering A, the second front wall covering B, the back wall covering E and the insulation C each have insulative (R–) values $R_D$, $R_A$, $R_B$, $R_E$, and $R_C$ respectively. Equation 1 may be used to estimate the potential R-value for a wall.

$$R_{eff}=R_A+R_B+(1/((f_C/R_C)+(f_D/R_D)))+R_E \quad \text{(Eq'n 1)}$$

where $f_C=F_C/(F_C+F_D)$, and $f_D=F_D/(F_C+F_D)$

Figure 6:
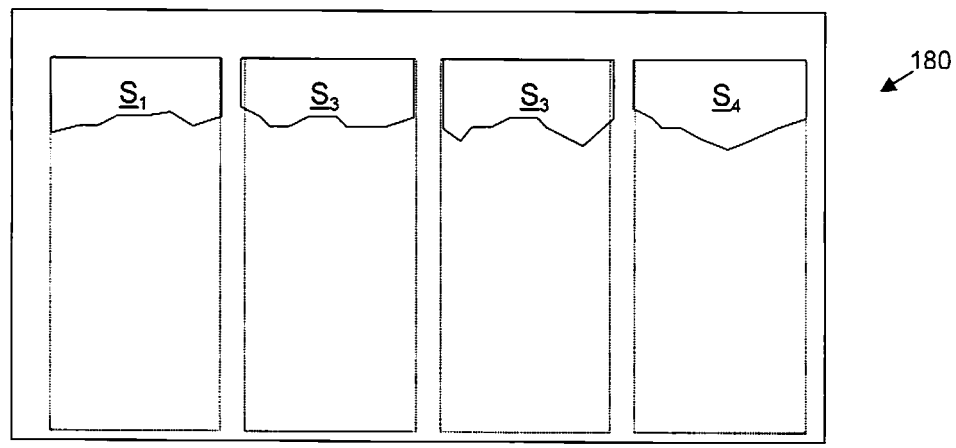
FIG. 6 is a schematic diagram of a wall with sagging insulation as viewed using a portable infrared camera system.

Image information may be used to determine if the potential R-value should be depreciated to due to actual structural conditions. For another example, referring to FIG. 6, image 180 illustrates an elevation view of a wall of a building where the fiberglass insulation in the wall has settled, leaving a gap at the top. The proportional area of settling may be estimated. By selecting an outline such as an isotherm line, the operator may outline the portions of the image, $S_1$, $S_2$, $S_3$, and $S_4$ as illustrated in FIG. 6. The sum of these four areas divided by the total image may be one way to approximate the proportional area which is allocated to the un-insulated portion of the wall. Just as the equation in the previous paragraph may be used to estimate the effective R-value for a stud wall, the same calculation may be used to determine the effective R-value for the wall with settled insulation, however, this time using an adjusted value for Rc, allowing for missing insulation.

$$\text{The adjusted value for } Rc=(1/((fS/Rcv)+((1-fS)/Rcf))) \quad \text{where} \quad \text{(Eq'n 2)}$$

fS=fraction of all sections "C" represented by S1+S2+S3+S4,
Rcv=R-value of section "C" void of insulation
Rcf=R-value of section "C" with fiberglass In this example, the operator may utilize a user interface in the portable inspection apparatus to select or enter normal value for Rcf (e.g., the R-value for the insulation that is expected to be found in a wall) and depreciated Rcv (e.g., the R-value for an air pocket) for use in Equation 1 and Equation 2.

Figure 7:
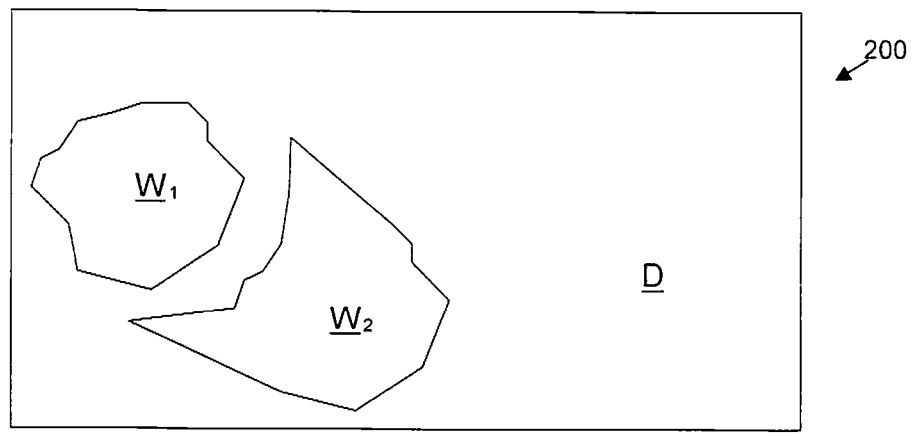
FIG. 7 is a somewhat schematic illustration of an infrared view of a roof with wet insulation as displayed on a portable infrared camera system.

FIG. 7 presents a schematic representation of an image 200 of a roof, the image being produced by an infrared imager. Image 200 may be used to discern the areas of a roof into which water has saturated roof insulation. Image 200 depicts a dry area D of the roof and two wet areas $W_1$ and $W_2$. In a typical embodiment the operator outlines portions of the roof which show a significant temperature transition due to moisture or missing insulation or gaps through which air exchange is taking place. Once again, outlines such as contour lines may be used to isolate the area of interest into which, in this case, water has soaked. In the case of wet insulation, the proportional area of a wet region compared to the full area may then be used to calculate effective R-value for the roof.

$$Reff=(1/((fH2O/RH2O)+((1-fH2O)/RR))) \text{ where} \quad \text{(Eq'n 3)}$$

fH2O=fraction of wall that is wet and is represented by W1+W2,
RH2O=R-value of the wet roof areas, and
RR=R-value of the dry roof areas.

The following is an implementation of Example 4 using an infrared imager with user interface limited to power on, power off, and display image adjustments. In this case the imager is typically dedicated to roof inspections and is programmed with firmware that is configured to find wet insulation. This firmware allows the operator to adjust the sensitivity represented on the display and apply a custom pallet so that the operator performing a roof inspection may highlight wet insulation using blue color over an otherwise grayscale background. The imager is further pre-programmed with expected R-values for wet and dry roof insulation, such as RR=50, and RH2O=20. The programmed imager is used in the field by an inspector who adjusts the image controls so that the imager displays meaningful information such as proportions for W1 and W2 compared to roof area D. The application firmware in the imager displays highlights over the thermally dissimilar wet areas using blue color, while displaying the remainder of the image in gray-scale. The inspector makes final adjustments to image contrast using his observations and personal experience and determines that the image on the display is realistic representation of wet in proportion to dry roof areas. Satisfied with this representation he notes an Reff value reported on the display. For example if W1+W2 compared to D yields fH2O=0.3, then Reff=(1/((0.3/20)+((1-0.3)/50)))=34.

The following is a second implementation of Example 4 using an infrared imager with more sophisticated user interface such as that disclosed by Piety in '117, Hamrelius in '824, and Garvey in 20060017821. In this case the imager may have multiple functionalities, in which case the user may select roof inspection, may enter or select the RR and RH2O values and produce the same result as in the previous example. Furthermore, the inspector may make use of thermal image analysis techniques such as thermal contours to assist with the outlining of areas W1 and W2. With the extended in-field user interface the operator has greater flexibility to perform a variety of functions.

An extension of this second implementation of Example 4 is to enable the in-field user to select from a series of algorithmic relationships or even to construct a desired algorithm while in the field. Furthermore the inspector with extended user interface may save images and include information from multiple images in the computations, thereby representing greater areas than one may capture in a single field of view.

Example 5

Fire Characteristics

Figure 8:
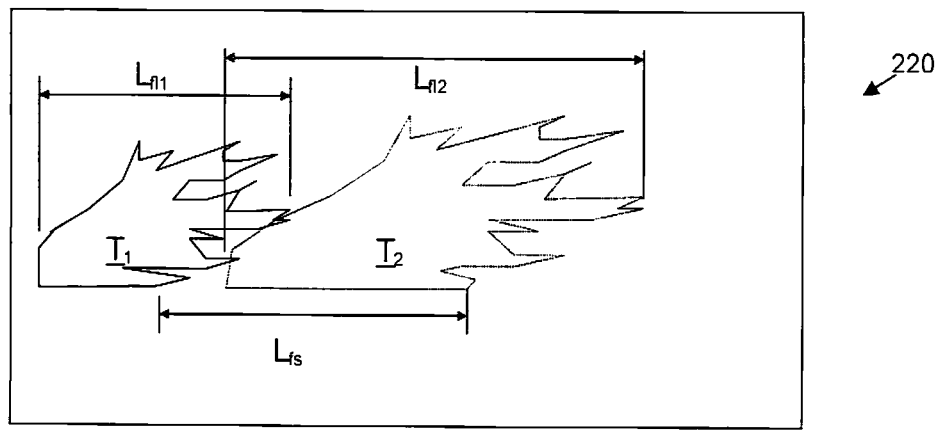
FIG. 8 is a somewhat schematic illustration of a changing fire situation as displayed over time on a portable infrared camera system.

Another purpose of a proportional dimension performance algorithm may be to estimate flame length, rate of spread, flashover or flameover, and other fire characteristics using the length and temperature information from the infrared imager. FIG. 8 portrays an image 220 composed in a display in a portable inspection apparatus. Area $T_1$ is an image of a fire taken at a first instant in time and area $T_2$ is an image of the same fire taken at a second instant in time, while keeping the image area frame of reference relatively consistent between the first and the second instants in time. Proportional dimension calculation techniques described previously herein are used to determine flame length $L_{fl1}$ and $L_{fl2}$ and flame displacement $L_{fs}$ in FIG. 8. Typically the length is measured on the display using a mouse to drag a representative distance across the frozen or dynamic infrared images. The operator may calculate the flame spread rate, $F_s$ using Equation 4.

$$F_s = L_{fs}/(T_2 - T_1)$$ (Eq'n 4)

$L_{fs}$ in Equation 4 may be estimated from the information captured over time using the infrared imager.

Warnings regarding potential flashover, flameover, or rollover may save firefighters lives. Although it is very difficult to predict the very rapidly spreading flashover or flameover conditions that occur when combustible gases accumulate and ignite along walls and ceilings. The infrared imager may be used to warn firefighters that evidence may be detected of two events that sometimes precede flameover or flashover: heat and rollover. When the gasses in the upper portions of a confined space accumulate smoke and extreme heat, the flameover or flashover may occur. Rollover is defined as sporadic flashes of flame mixed with smoke at a ceiling. Analyzed infrared information used in typical embodiments includes the use a vertical temperature gradient to mark off the vicinities where temperature is in range for flashover.

FIG. 9 portrays a schematic representation of an image 240 that may be presented in the field to an operator of a portable inspection device using an infrared imager to inspect the interior surface of a wall such that the upper portion of the image is the upper portion of the space and the lower portion of the image is the lower portion of the space. A temperature gradient 242 is portrayed on the Y-axis and the X-axis is the horizontal extent of a visual image, in this case a wall. When the temperature gradient 242 spans a very large range from bottom to top such as 300° F. at the bottom and 2000° F. at the top, then there is a very high probability of flashover. Flashover is defined as the temperature point at which the heat in the area or region is high enough to ignite all flammable materials simultaneously. In this example if oxygen is introduced to the upper space then combustion would probably be immediate and violent. The imager may be programmed with additional information interpreting the flashover potential and displaying a horizontal flashover line 244 at a threshold temperature value as well as a text and audio warning of impending danger. Threshold temperature value is typically a material property such as flash point selected to represent materials in the upper space. Portions of the display that are in region 246 of image 240 are above the flashover temperature and portions of the image that are in region 248 of image 240 are below the flashover temperature. Calibrated-temperature-measuring infrared imagers are preferred for this application. However, it is expected that imager-only (e.g., thermal imagers that are not calibrated to measure absolute temperature) imagers may also be programmed in a way that identifies the vicinity of an extreme-temperature-gradient around which flashover is a potential risk or in another way that assists the fireman to provide early warning of this serious safety risk.

FIG. 10 illustrates a schematic view of an image 260 from an infrared imager being used to inspect a ceiling 262 such that the upper portion, lower portion, left side, and right side of the image are all ceiling surfaces. A difference between FIGS. 9 and 10 is the orientation of the camera has changed from horizontal in FIG. 9 to vertical in FIG. 10. The imager may incorporate a performance algorithm to notify the operator of a possible rollover location where the entire image is near flashover temperature, but one area displays high temperature excursions of a transient nature. Rollover is defined as sporadic flashes of flame mixed with smoke at a ceiling. In FIG. 10 the temperature of the entire ceiling 262 is high. One local area 264 s seen to rollover in a four step sequence, starting with hotspot area 266 that expands to hotspot area 268 that expands to hotspot area 270 that then collapses to hot spot area 272.

Performance algorithms in imagers may be used to determine the proportion of area in which hotspots are found. After the fire has burned out, then firefighters perform overhaul. In this stage they look for hot spots with the intention of poking into the hot spot, applying water, and cooling down the hot spots, thereby speeding up the completion of the job. A performance algorithm may be used in the imager to calculate the proportion of area surveyed covered by hotspots. To do this, the imager typically uses a threshold hotspot isotherm level and calculates the relative proportion of area included inside the isotherm(s) compared to the remainder of the image such as according to Equation 5.

$$\text{Overhaul Remaining} = \text{Hot Spot portion of the image}/\text{Total image}$$ (Eq'n 5)

The calculation may be instantaneous for an image or may be an accumulation for an integral area larger than the field of view.

The following is implementation of Example 5 using an imager similar to that disclosed by Warner. In '849 Warner describes a scheme of highlighting portions near human body temperature in a manner that is visually distinct from all other portions of the image. In a similar manner thermal information may be analyzed to highlight hot spot portions of the image. Exemplary embodiments significantly extend this rudimentary concept wherein the imager is further programmed to calculate the area represented by the hot spots in the image divided by the total image area. This ratio is displayed as a value of overhaul remaining on the imager display.

Example 6

Valve Performance

Another purpose of a proportional dimension performance algorithm may be to estimate the amount of material lost through a faulty steam trap or other type valve. These losses are calculated using ideal gas laws, steam tables, thermodynamics, fluid dynamics, or other equations based on physical principles appropriate for the particular application. To perform these calculations, one skilled in the art must gather specific information about the gas or fluid, the system pressure and temperature, and the application geometry and orifice characteristics. A typical embodiment employs simplified calculations in the portable infrared camera, and uses information collected in the field to make in-field computations. This normally requires compromise wherein gross assumptions are made in order to get an approximate result even though some elements of specific information are yet unknown.

For example, the firmware in an infrared camera may be used to estimate the losses from a faulty steam trap in the following manner. First, prompt the user to select the type trap from the following list: thermostatic steam traps, mechanical steam traps (including float-thermostatic trap, inverted bucket trap), thermodynamic steam traps, and assume mechanical steam trap with float-thermostatic trap as default. Prompt the user to determine if the trap has failed using the information seen on the infrared imager. Then assume an orifice diameter size of 7/32" (or 0.218 inch) which would pass 24 lbs/hr @ 5 psig as this is a typical situation. Next prompt the user asking at what percent open did the trap fail, accepting 50% as the default if a particular answer is not given. Next, prompt the user to input how many hours per day the trap encounters steam, accepting 12 hours per day as default. Next prompt the user to input how many days per year the trap encounters steam, accepting 25% (or 91 days) as the default. This information may be used to derive an estimate of 24 lbs/hr steam loss. At $7.50 per 1000 lbs, this amounts to $197.38 per year. This information might be displayed as image 280 on an infrared imager as follows shown in FIG. 11.

An alternate performance algorithm may simply calculate typical values in mass and dollars for a steam trap failed in the open position; then simply allow the user to determine the condition of the steam trap or other type valve using information from the infrared imager, and then record these values in the imager memory for later accumulation and reporting purposes.

Example 7

Gas Emissions

Another purpose of a proportional dimension performance algorithm may be to estimate a performance parameter associated with gas emissions such as dynamic volume of gas cloud detected with imager sensitive to fugitive hydrocarbon or other gas emissions. Certain infrared imagers such as the GasFindIR by FLIR are designed to detect the presence of particular hydrocarbon gas emissions. By using the proportional dimension capability of the present invention, the software may be used to calculate the relative or absolute cross sectional representing the volume of gas emission.

Figure 12:
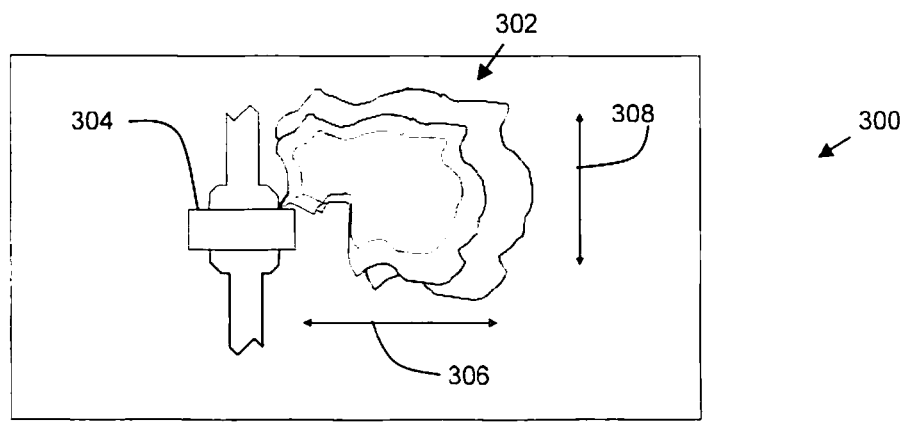
FIG. 12 is a somewhat schematic illustration of a gas leak as displayed on a portable infrared camera suitable for detecting those gases.

For example, FIG. 12 presents a schematic view of a an image 300 from an infrared imager showing a gas cloud 302 escaping from a chemical process fitting 304. By measuring the horizontal 306 and the vertical 308 distances representing the approximate boundaries of the gas cloud 302, one may use Equation 6 to approximate the volume of space around the leak where the gas is at a concentration higher than the minimum detectable limit, MDL, for the imager in association with the particular gas.

$$V_{MDL} = (\text{width} + \text{height})/2)^3 \times (4/3) \times (Pi) \qquad (\text{Eq'n 6})$$

The value, $V_{MDL}$ may be used directly as a relative measure of the size of one gas leak compared to another. On the other hand, one might perform empirical testing or theoretical calculations to approximate the volumetric rate of gas leaking, either at standard temperature and pressure or at other conditions that will sustain this size detectable gas leak and thereby calculate a dollar value of the gases lost.

The estimate of the volume of space around the leak may be improved if the infrared camera operator is able to input particular information about gas pressure inside the system or about the nature orifice through which the gas is flowing. Another extension of this volume calculation is the identification of the vicinity of the leak wherein it is particularly dangerous to ignite a spark so as to avoid fire or explosion. It is anticipated that, knowing the minimum detection limit for a particular hydrocarbon, and knowing the fuel to air ratio necessary to support combustion, one could program the infrared camera to distinguish and highlight an area on the image where spark ignition is particularly risky. This may be inside or outside the outline of the gas on the image depending on the particular gas and detection limits.

After a leak is found and sized, it is meaningful to verify the completeness of the repair that has been done to correct the leak. The present calculation of gas volume may be used to quantify the improvement or reduction in leakage rate as a matter of proportion.

Another performance algorithm may be used to assist the user with identifying locations around the gas leak where safety precautions are particularly applicable. For example, the firmware may prompt the user to identify a contour line representative of the detected hydrocarbon gas cloud. Then if the minimum detection limit for the particular hydrocarbon gas is smaller than or greater than the critical fuel-to-air ratio needed to support combustion, the firmware may be programmed to estimate the position of a second contour line, either inside or outside of the first, approximating the volume of space where ignition in the presence of a spark source is most likely.

Example 8

Electrical Faults

Another performance algorithm may use delta-T or severity to estimate time-to-failure or safe distance or another performance parameter associated with electrical faults. Electrical faults are normally detected using infrared imaging based on the elevated temperatures due to resistance heating in the vicinity of the fault. The severity of the fault is often directly in proportion to the delta temperature (e.g., differential temperature) between faulty components and normal components. The severity limit for an electrical fault is often reflected as a delta-T alarm on the display. If one uses a 20° C. limit for high fault then the operator may designate an abnormal or faulty component with a first cursor and identify a normal component with a second cursor. The infrared camera then displays the delta-T and reports an alarm compared to the 20° C. limit. The present invention goes another step and calculates such things as time-to-failure or safe distance based on information programmed into the in-camera firmware and reports the finding on the display. For example, if the actual delta-T is 60° C., compared to high alarm delta-T of 20° C.; and if the limit life of the component at high alarm is 180 days, then the firmware may use Equation 7 to estimate time-to-failure:

$$\text{Time to failure} = ((\text{high alarm delta-}T)/(\text{actual delta-}T))^\wedge 3 * (\text{limit life}), \text{or} \quad (\text{Eq'n 7})$$

Time to failure=(20/60)^3*180=7 days.

For another example the delta-T or severity information may be used to determine a risk factor which in turn is used to calculate and display safe distance for the operator in vicinity of an identified electrical fault. In this case the operator determines (A) the presence of electrical fault, (B) the severity of that fault based on factors such as delta-T and voltage, (C) component or equipment type, and inputs this information the infrared imager user interface. The in-camera firmware uses programmed rule-based logic to determine safe distance based from those inputs.

As another example, Equation 8 may be used to scribe a radius representing safe distance based on NFPA 70 E formula to calculate arc-flash boundaries.

$$D_c = (2.65 * MVA_{fb} * t)^\wedge \frac{1}{2}, \text{where} \quad (\text{Eq'n 8})$$

$D_c$=distance in feet from an arc source for a second-degree burn $MVA_{fb}$=bolted fault capacity in mega volt-amperes available at the point involved—a function of available short circuit current, and t=time in seconds of arc exposure Two particularly practical ways to use Equation 8 in the imager are to either assume values for $MVA_{fb}$ and t, or prompt the user to input values for $MVA_{fb}$ and t.

Yet another example using delta-T information in association with an electrical fault calculation is to derive increased contact resistance. In this case an inspector uses a programmed infrared imager capable of measuring delta-T information and calculating contact resistance. The operator inspects a series of contacts operating normally and identifies a normal delta-T for those contact of 10 degrees C. above ambient. The operator logs this information into the imager and selects the specified contact resistance for these contacts such as 3 ohms. During the inspection the operator finds one particular contact with normal loading conditions but higher than normal delta-T value of 30 degrees C. above ambient. The programmed imager uses the relationship $P=I^2 R$, where P is power, I is current, and R is electrical resistance. I may be assumed to be constant, provided the resistance change in the contact is a very small portion of the total resistance loading considering the driven equipment on the power line. Therefore the programmed imager uses the following relationship to calculate and display resistance values associated with the observed temperature excursion:

Rc=Calculated resistance=Rn×((dTc−dTn)/dTn), where
Rn=Normal or specified resistance=3 ohm
dTn=delta-T above ambient for contact with normal or as-specified electrical resistance
dTc=delta-T above ambient for contact with abnormal thermal excursion.
Therefore, Rc=3×((30−10)/10))=9 ohms.
After calculating this result, the imager displays the following information:
"Normal specified resistance=3 ohms
Estimated resistance for this connection=9 ohms, 300% above specified value."
Other embodiments using delta-T information to calculate power loss and derive associated physical property values as applicable may be extrapolated. Impedance losses often produce electrical heating in proportion to the impedance values as in the aforementioned case regarding electrical resistance. Other impedance loss mechanisms such as mechanical friction also produce thermal heating in which the increased temperature is in proportion to the increased mechanical resistance or friction coefficient.

Example 9

Cash Value

Another purpose of a proportional dimension performance algorithm may be to estimate the dollar value that one could apply to any of the above calculations. One of the most useful calculation algorithms that may be used in an infrared imager is one that estimates cash value (e.g., cost avoidance or cost savings or actual cost incurred). These calculations typically are accomplished by using the infrared imager in the field to find or verify the existence of a problem. Then the in-camera firmware prompts the user to provide information to allow the in-camera computer to calculate cash value. An example is given for the steam trap in the foregoing case where 24.1 lbs/hour loss was determined, the steam trap encounters steam for 12 hours per day and 91 days per year, and the cost of steam is $7.50 per 1000 lbs of steam. Therefore the annual cost for this failed trap is estimated to be 24.1×12×91×7.50/1000=$197.38 per year.

For another example, the infrared imager may be used to detect an electrical connection that leads to switchgear providing primary power to a manufacturing facility. Upon recording this entry in the infrared imager the firmware may prompt the user through information on the display to estimate the following (example responses are in capital letters beside each prompt):

i. Could this event prompt a production outage? YES
ii. Can such an outage be avoided by implementing a planned and scheduled repair? YES
iii. What is the hourly cost for an unplanned outage? $17,000
iv. How long will it take to repair an unplanned failure of this type? 16 HOURS
v. What is the repair cost if this is an emergency repair? $10,000
vi. What is the repair cost if this is a planned and scheduled repair? $5,000

Equation 9 may then be used to calculate the cash value.

$$\text{Calculated cash value} = (A \times B) + C + D + E - F \quad (\text{Eq'n 9})$$
$$= (17,000 \times 16) + 10,000 - 5,000$$
$$= \$277,000$$

Example 10

Rate of Change

Another purpose of a proportional dimension performance algorithm may be to estimate the change-over-time for a thermal or geometric aspect distinguished with the imager. An example of this is already described above considering fire calculations at first and second points in time. Rate of change calculations are important for in-field infrared imaging because these enable the technician using the camera to have real-time information helping him or her to do their assignment with greater accuracy and knowledge. This plays an important role in many applications where transient thermal conditions are experienced, and since heat transfer is frequently not in a steady state condition, there are nearly limitless applications where rate of change calculations may be employed. Keep in mind however that this is different from traditional trending where data is collected periodically and uploaded to a desktop computer with historical database. In this case the technician in the field collects first and second measurements and makes a rate of change calculation while in the field.

For another example, the user of this feature typically desires to establish a steady field of view, which is easily done by mounting the imager or holding it steady. Then the technician triggers the transient capture mode. When this is done the firmware in the camera baselines the image by recording the temperature values for every pixel, then it automatically tracks one or all of the following:

change in maximum temperature for all pixels,
change in minimum temperature for all pixels, or
change in each pixel over a designated time interval.

Typically the designated time interval is the period between first and second button clicks. The display may be used to report the delta-temperature for maximum and minimum pixel values along with a gray-scale or color pallet delta-temperature map, similar in function to the thermal image, yet very different in appearance. One may choose to overlay a partially transparent representation of the delta temperature image over the baseline temperature image. There are many other variations to this format which may be employed to fit a particular need or user preference.

Example 11

Other Calculations

There are many other calculations using performance algorithms that may be done in the manner of the previous examples. For instance one may apply the proportional dimensions calculation to estimate the physical dimensions of a fault that could be found in a furnace, boiler or other refractory structure. In the same way one may apply thermal insulation heat transfer calculations to these applications and others. Furthermore the calculation of thermal efficiency, power, friction losses, are just a few of the many other algorithmic calculations that may also be imbedded into firmware and used to prompt infrared camera operators to perform better inspections, analyses, and reports while in the field.

Example 12

Auto-Scale Compensation

Many infrared imagers convert thermal emissivity information to color images where portions of the image that are relatively hot are portrayed in red tones, portions of the image that are relatively average are portrayed in green tones, and portions of the image that are relatively cool are portrayed in blue tones. In order to highlight the relative differences many infrared imagers incorporate a feature called "auto-scaling." With auto-scaling, the highest temperature regions in an image is portrayed as red, the average temperature regions are portrayed as green, and the lowest temperature regions are portrayed as blue, regardless of absolute temperatures. This in image of objects ranging in temperature from 70 to 80 degrees portrayed with auto-scaling may have the same color depictions as an image of the same objects ranging in temperature from 75 to 85 degrees or from 80 degrees to 120 degrees. Auto-scaling is beneficial to the extent that it maximizes the portrayal of temperature differences (i.e., it maximizes temperature resolution), but it is detrimental to the extent that it may cloak important absolute temperature excursions.

Figure 13A:
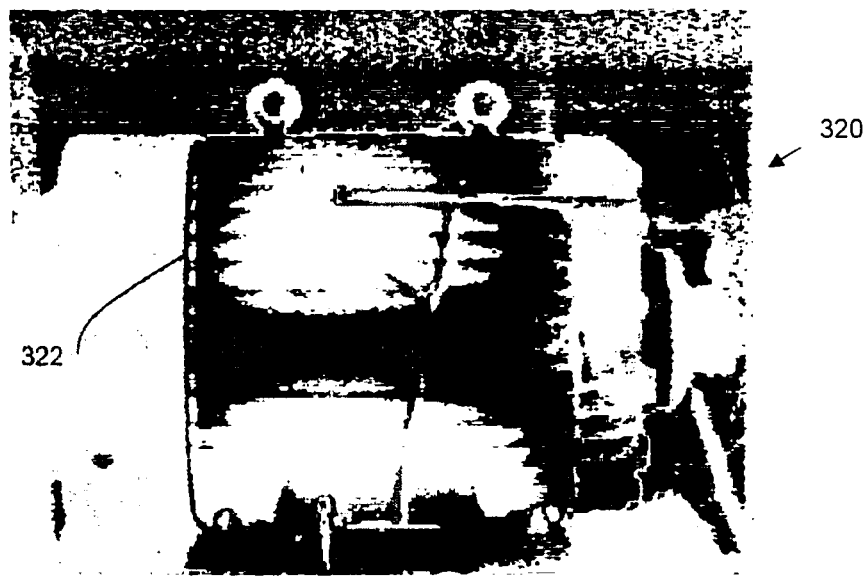
FIG. 13A depicts an infrared image of a motor inspected at a first date using a portable infrared camera system.
Figure 13B:
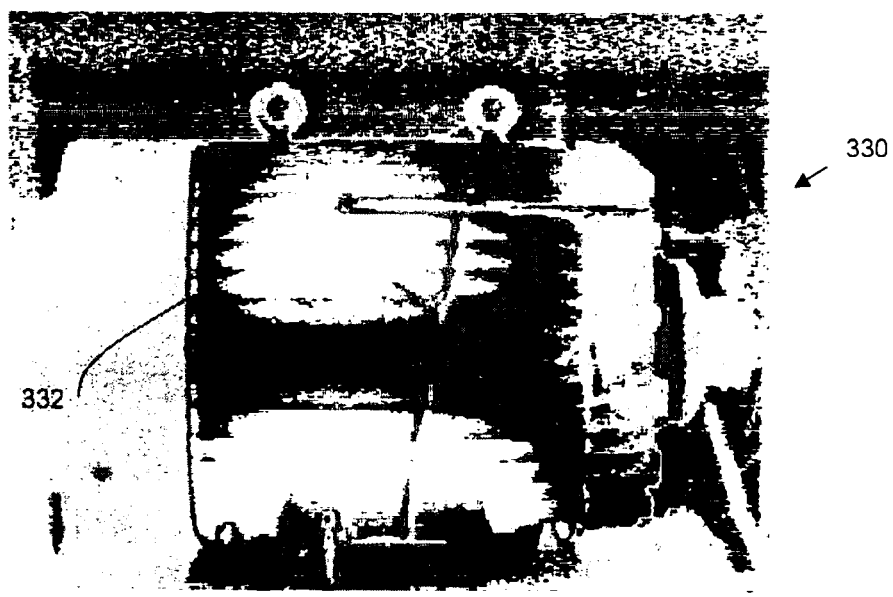
FIG. 13B depicts an infrared image of the motor of FIG. 13A inspected at a second date using a portable infrared camera system.

For example, FIG. 13A depicts a simplified image 320 from a thermal imager. Image 320 that has been converted from a color thermal image to a gray-scale image for purposes of illustration here. FIG. 13A depicts a motor 322 inspected at a first date, the image showing a minimum temperature of 75° F. and a maximum temperature of 135° F. The imager was set to auto-scale from 75° F. to 135° F. FIG. 13B depicts a simplified image 330 of from a thermal imager taken at a second date six months after the first date. Image 330 showing a minimum temperature of 85° F. and a maximum temperature of 182° F., and the imager was set to auto-scale from 75° F. to 135° F. FIG. 13A and FIG. 13B are visually substantially the same, a similarity that also exists in the original color thermal images that were used to create FIGS. 13A and 13B.

Figure 13C:
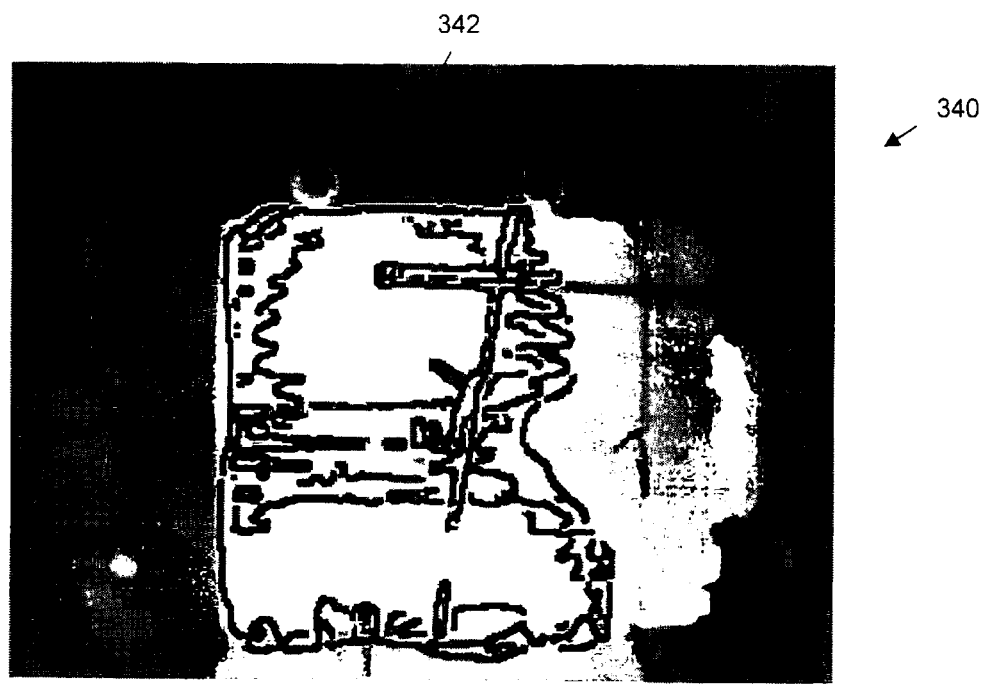
FIG. 13C depicts an infrared image of the motor of FIGS. 13A and 13B that has been enhanced by a performance algorithm and displayed on a portable infrared camera system.

FIG. 13C depicts an image 340 that has been modified by a performance algorithm to compare the image 320 of FIG. 13A with the image 330 of FIG. 13B, removing auto-scaling adjustments and highlighting an area 342 of the image that are above a threshold temperature of 135° F. or some other determined threshold based on reference image. This highlighting of area 342 by the performance algorithm helps alert the operator that something has changed between the two images.

Figure 14:
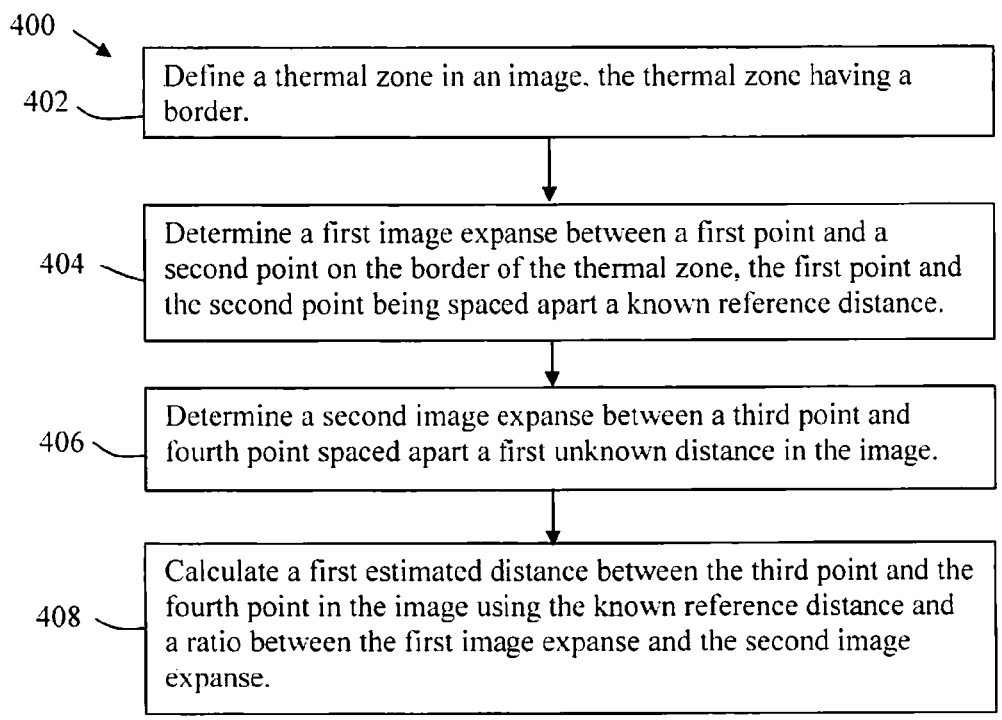
FIG. 14 depicts a flow chart of a method embodiment.

FIG. 14 illustrates a flow chart 400 of a method embodiment. In step 402, a thermal zone is defined in an image, the thermal zone having a boundary. In step 404, a first image expanse is determined between a first point and a second point on the boundary of the thermal zone, the first point and the second point being spaced apart a known reference distance. Step 406 includes determining second image expanse between a third point and fourth point spaced apart a first unknown distance in the image. In step 408 a first estimated distance between the third point and the fourth point in the image is calculated using the known reference distance and a ratio between the first image expanse and the second image expanse.

In summary, provided herein are systems and methods for enhancing inspections using infrared cameras through in-field displays and operator-assisted performance calculations. A handheld infrared imaging system typically includes an infrared camera having a programmed computer (optionally with stored reference data from previous infrared or optical scans) and an interactive user interface suitable for displaying images and prompting response and accepting input from the infrared camera operator in the field during an inspection. The user interface may enable an operator to designate at least one thing of interest on a displayed infrared image; and the programmed computer uses a performance algorithm to estimate performance associated with the thing of interest such as one of the following: a dimensioned-measurement value or a thermal-property characteristic or an electrical-property characteristic or a cash value or a rate-of-change characteristic or an assessment of risk or danger. The programmed computer may extract information or parameters from previously measured data (either transferred down from the PC database or locally resident in the camera from previously stored measurements). The programmed computer may vary the way in which it displays new measurements, including live or continuously updated display, based on the information extracted from the stored data. Implementations may incorporate a device used for periodic measurements or an "online" device used for continuous or continuously updated monitoring. One or more of the parameters extracted from the IR image may be trended or otherwise adapted to provide an automated alert to the user regarding significant changes or important findings.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for estimating a time to failure of a component using a programmable infrared camera having programmed logic, comprising:
    (a) inputting into the programmed logic a limit life for the component;
    (b) inputting into the programmed logic a high alarm delta-T for the component;
    (c) measuring a first temperature of a faulty component with the programmable infrared camera;
    (d) measuring a second temperature of a normal component with the programmable infrared camera;
    (e) subtracting the second temperature from the first temperature to provide a delta-T temperature in the programmed logic;
    (f) using the programmed logic to divide the high alarm delta-T by the calculated delta-T temperature to obtain a ratio; and
    (g) using the programmed logic to multiply the limit life by a function of the ratio to estimate the time to failure of the component.

2. The method of claim 1 wherein the programmable infrared camera has a display with a first cursor and a second cursor, and
    step (a) comprises measuring the first temperature of the faulty component with the programmable infrared camera by positioning the first cursor over a first image of the faulty component on the display; and
    step (b) comprises measuring the second temperature of the normal component with the programmable infrared camera by positioning the second cursor over a second image of the normal component on the display.

3. The method of claim 1 where in step (e) comprises using the programmed logic to multiply the limit life by an exponential function of the ratio.

4. The method of claim 1 wherein step (e) comprises using the programmed logic to multiply the limit life by the ratio cubed.

5. A method of advising a safe distance from an arc-flash hazard to an operator using a programmable infrared camera having programmed logic and a display, comprising:
    (a) programming the programmed logic with a formula employing at least one variable for calculating a safe distance from an arc-flash source;
    (b) inputting the at least one variable into the programmed logic;
    (c) using the programmed logic to calculate the safe distance; and
    (d) displaying the safe distance on the display.

6. The method of claim 5 wherein the programmable infrared camera comprises a user interface for inputting the at least one variable into the programmed logic and step (b) comprises prompting the user to use the user interface to input the at least one variable into the programmed logic.

7. The method of claim 5 wherein step (b) comprises inputting the at least one variable into the programmed logic as an assumed value.

8. A method for estimating an actual electrical impedance of an electrical component in a system drawing an electrical current, the method using a programmable infrared camera having programmed logic and comprising:
    (a) inputting into the programmed logic a normal impedance for the electrical component;
    (b) inputting into the programmed logic a normal above-ambient delta-T value for the electrical component;
    (c) using the programmable infrared camera to input into the programmed logic a measured above-ambient delta-T value for the electrical component;
    (d) subtracting the normal above-ambient delta-T value from the measured above-ambient delta-T value to provide a delta-T variance in the programmed logic;
    (e) using the programmed logic to divide the delta-T variance by the normal above-ambient delta-T value to obtain a variance ratio; and
    (f) using the programmed logic to multiply the normal impedance by the variance ratio, wherein the electrical current drawn by the system is assumed to be a constant that is independent of the actual electrical impedance of the electrical component to estimate the actual electrical impedance of the electrical component.

9. A method for estimating an actual friction resistance of a mechanical component using a programmable infrared camera having programmed logic, comprising:
    (a) inputting into the programmed logic a normal friction resistance for the mechanical component;
    (g) inputting into the programmed logic a normal above-ambient delta-T value for the mechanical component;
    (h) using the programmable infrared camera to input into the programmed logic a measured above-ambient delta-T value for the mechanical component;
    (i) subtracting the normal above-ambient delta-T value from the measured above-ambient delta-T value to provide a delta-T variance in the programmed logic;
    (j) using the programmed logic to divide the delta-T variance by the normal above-ambient delta-T value to obtain a variance ratio; and
    (k) using the programmed logic to multiply the normal friction resistance by the variance ratio to estimate the actual friction resistance of the mechanical component.

* * * * *